United States Patent
Yanagawa et al.

(10) Patent No.: US 9,573,562 B2
(45) Date of Patent: Feb. 21, 2017

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Wataru Yanagawa, Aichi-ken (JP); Kenji Fukuta, Aichi-ken (JP); Nao Sasaki, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 176 days.

(21) Appl. No.: 14/571,987

(22) Filed: Dec. 16, 2014

(65) Prior Publication Data

US 2015/0175123 A1    Jun. 25, 2015

(30) Foreign Application Priority Data

Dec. 24, 2013  (JP) ................................ 2013-265609

(51) Int. Cl.
*B60R 22/36* (2006.01)
*B60R 22/34* (2006.01)
*B60R 22/28* (2006.01)

(52) U.S. Cl.
CPC ............ *B60R 22/341* (2013.01); *B60R 22/36* (2013.01); *B60R 2022/286* (2013.01); *B60R 2022/288* (2013.01)

(58) Field of Classification Search
CPC .............................. B60R 22/36; B60R 22/341
See application file for complete search history.

(56) References Cited

U.S. PATENT DOCUMENTS

| | | | |
|---|---|---|---|
| 6,739,541 B2* | 5/2004 | Palliser | B60R 22/3413 242/379.1 |
| 2003/0192975 A1* | 10/2003 | Palliser | B60R 22/3413 242/379.1 |
| 2003/0192976 A1* | 10/2003 | Palliser | B60R 22/3413 242/379.1 |
| 2005/0087641 A1* | 4/2005 | Bell | B60R 22/3413 242/379.1 |

FOREIGN PATENT DOCUMENTS

JP    2001-310705    6/2001

\* cited by examiner

*Primary Examiner* — Sang Kim
(74) *Attorney, Agent, or Firm* — Roberts Mlotkowski Safran Cole & Calderon, PC

(57) ABSTRACT

In a webbing take-up device, a lock ring of an energy absorption mechanism is disposed coaxially to a spool. An anchor hook (one end portion) of a wire is anchored to the lock ring, and the wire is wound around a wire attachment face (outer peripheral portion) of the lock ring from the anchor hook to another end portion of the wire. Most of the wire excluding a second energy absorption portion is accordingly disposed around the wire attachment face of the lock ring that is disposed coaxially to the spool, thereby enabling an increase in size of the body of the webbing take-up device to be suppressed in comparison to a case in which the lock ring is disposed parallel to the spool.

8 Claims, 6 Drawing Sheets

WEBBING TAKE-UP DEVICE

CROSS-REFERENCE TO RELATED APPLICATION

This application claims priority under 35 USC 119 from Japanese Patent Application No. 2013-265609 filed Dec. 24, 2013, the disclosure of which is incorporated by reference herein.

BACKGROUND

Field of the Invention

The present invention relates to a webbing take-up device provided with an energy absorption member.

Related Art

In a retractor (webbing take-up device) described in Japanese Patent Application Laid-Open (JP-A) No. 2001-310705, a locking base is fixed to one end portion of a bobbin (spool) so as to be capable of rotation integrally therewith. In a vehicle emergency, a pole provided to the locking base engages with a latch plate. When this occurs, a shear pin that fixes the latch plate is broken, and the latch plate rotates.

The retractor described above is provided with a housing shaft, with the housing shaft disposed parallel to the bobbin (spool). A wire member (energy absorption member) is wound around the housing shaft. The wire member extends from the housing shaft to a pulley of the latch plate, and one end of the wire member is anchored to the pulley. The wire member extending from the housing shaft to the pulley abuts a deforming portion configured by an EA bolt. When the latch plate is rotated, while the wire member is deformed by the deforming portion of the EA bolt, the wire member is wound onto the latch plate. Impact energy is thereby absorbed.

However, with this retractor, there is an issue that the retractor has a large body since the housing shaft, around which the wire member is wound, is disposed parallel to the bobbin (spool) as described above.

SUMMARY

In consideration of the above circumstances, the present invention is to obtain a webbing take-up device capable of suppressing an increase in body size.

A webbing take-up device of a first aspect of the present invention includes: a spool that rotates in a pull-out direction by a webbing being pulled out; a first energy absorption member that extends along an axial center of the spool, that has one end portion engaged with the spool such that the first energy absorption member is capable of rotating integrally with the spool, and that is configured so as to be capable of undergoing torsional deformation; a lock mechanism that is engaged with another end portion of the first energy absorption member so as to be capable of rotating integrally with the first energy absorption member, and that actuates to block rotation of the first energy absorption member in the pull-out direction at least one of when a vehicle suddenly decelerates or when the spool suddenly rotates in the pull-out direction; a rotating body that is disposed coaxially with the spool, and that is coupled to the spool and is rotated in the pull-out direction together with the spool, by the spool rotating in the pull-out direction relative to the lock mechanism; a second energy absorption member that is configured by an elongated wire member, that has one end portion anchored to the rotating body, and that is wound from the one end portion to another end portion onto an outer peripheral portion of the rotating body; and an energy absorption portion that configures a part of the second energy absorption member, that is pulled out from the outer peripheral portion of the rotating body toward an outer side in a radial direction of the rotating body, and that is deformed by a deforming portion disposed at the outer side in the radial direction of the rotating body when the rotating body rotates in the pull-out direction.

In the webbing take-up device of the first aspect, the first energy absorption member is disposed extending along the axial center of the spool. The one end portion of the first energy absorption member is engaged with the spool such that the first energy absorption member is capable of rotating integrally (as a unit) with the spool, and the lock mechanism is engaged with the another end portion of the first energy absorption member so as to be capable of rotating integrally (as a unit with) the first energy absorption member. The spool and the lock mechanism are thus coupled together through the first energy absorption member so as to be capable of rotating integrally (as a unit). The lock mechanism actuates to block (prevent) rotation of the first energy absorption member in the pull-out direction in at least one event of a sudden vehicle deceleration or a sudden rotation of the spool in the pull-out direction. Rotation of the spool in the pull-out direction is accordingly also blocked (prevented), enabling the restraining force of the webbing on an occupant to be improved at a time of a vehicle emergency.

In an actuated state of the lock mechanism, the first energy absorption member undergoes torsional deformation (twisting deformation) when rotation force acting on the spool in the pull-out direction exceeds the mechanical strength of the first energy absorption member. Accordingly, rotation of the spool in the pull-out direction is permitted at a first force limiter load (the torsional (twisting) deformation withstand load of the first energy absorption member) or greater, enabling kinetic energy of the occupant, which is used to pull the webbing, to be absorbed by the first energy absorption member.

Note that the webbing take-up device is provided with the rotating body, the rotating body being disposed (arranged) coaxially to the spool. One end portion of the second energy absorption member configured by the elongated wire member is anchored (caught) to the rotating body, and the second energy absorption member is wound from the one end portion to the another end portion onto the outer peripheral portion of the rotating body.

A portion of the second energy absorption member is configured by the energy absorption portion. The energy absorption portion is pulled out (drawn out) from the outer peripheral portion of the rotating body toward the radial direction outside of the rotating body. When the spool rotates in the pull-out direction relative to the lock mechanism (namely, when the first energy absorption member undergoes twisting deformation), the rotating body is coupled to the spool and rotates in the pull-out direction together with the spool. When this occurs, the energy absorption portion of the second energy absorption member is deformed by the deforming portion. Accordingly, rotation of the spool in the pull-out direction is permitted at a second force limiter load (the total of the twisting deformation withstand load of the first energy absorption member and the deformation withstand load of the second energy absorption member) or greater, enabling kinetic energy of the occupant, which is provided to pull the webbing, to be absorbed by the first energy absorption member and the second energy absorption member.

As described above, in the first aspect of the present invention, most portion of the second energy absorption member, excluding the energy absorption portion, is disposed (arranged) around the outer peripheral portion of the rotating body that is disposed coaxially to the spool, thereby enabling an increase in the size of the webbing take-up device to be suppressed in comparison to a case in which the rotating body is disposed parallel to the spool.

A webbing take-up device of a second aspect of the present invention is the webbing take-up device of the first aspect, wherein: a housing portion, that houses a coupling member that couples the spool and the rotating body, is formed at the spool; and the rotating body is formed in a tube shape, and is disposed at the outer side in the radial direction of the spool with respect to the housing portion.

In the webbing take-up device of the second aspect, the spool is formed with the housing portion, and the coupling member that couples the spool and the rotating body together is housed in the housing portion. Moreover, the rotating body is formed in a tube shape, and is disposed at the radial direction outside of the spool with respect to the housing portion. An increase in size of the webbing take-up device along the axial direction of the spool can accordingly be suppressed.

A webbing take-up device of a third aspect of the present invention is the webbing take-up device of either the first aspect or the second aspect, the webbing take-up device further includes a switching mechanism, wherein: the deforming portion is configured including a first deforming portion configured so as to be incapable of relative movement with respect to the energy absorption portion, and a second deforming portion that is configured so as to be capable of movement in a direction away from the energy absorption portion; movement of the second deforming portion in the direction away from the energy absorption portion is blocked by the second deforming portion being engaged with the switching mechanism in a state in which the switching mechanism is not actuated; and movement of the second deforming portion in the direction away from the energy absorption portion is permitted by actuation of the switching mechanism.

In the webbing take-up device of the third aspect, the deforming portion includes the first deforming portion and the second deforming portion. The first deforming portion is configured so as to be incapable of relative movement with respect to the energy absorption portion of the second energy absorption member, and the second deforming portion is configured so as to be capable of movement in a direction away from the energy absorption portion. The webbing take-up device of the third aspect further includes a switching mechanism. The second deforming portion is coupled to the switching mechanism. Movement of the second deforming portion in the direction away from the energy absorption portion is blocked (prevented) by the second deforming portion being engaged with (coupled to) the switching mechanism in a state in which the switching mechanism is not actuated. This enables the energy absorption portion to be deformed by the first deforming portion and the second deforming portion. On the other hand, configuration is made such that movement of the second deforming portion in the direction away from the energy absorption portion is permitted by the switching mechanism being actuated. This enables the energy absorption portion to be deformed by the first deforming portion only. Switching of the second force limiter load to a smaller load is thereby enabled.

A webbing take-up device of a fourth aspect of the present invention is the webbing take-up device of the third aspect, wherein the second deforming portion is formed as a slider configured so as to be capable of sliding in the direction away from the energy absorption portion; and the switching mechanism includes: a piston that is engaged with the slider and blocks movement of the slider in the direction away from the energy absorption portion, a cylinder into which the piston is inserted, and a gas generator that supplies gas into the cylinder by actuation thereon, and moves the piston along the cylinder to release an engaged state between the piston and the slider.

In webbing take-up device of the fourth aspect, the second deforming portion is formed as a slider, and the piston is inserted inside the cylinder. The slider is engaged with the piston of the switching mechanism, blocking (preventing) movement of the slider in a direction away from the energy absorption portion. Actuating the gas generator supplies gas into the cylinder, the piston is moved along the cylinder, releasing the engaged state between the piston and the slider. The slider can thus be moved away from the energy absorption portion in an instant, enabling the second force limiter load to be switched to a smaller load.

In the above aspects, it is possible that the webbing take-up device further includes a body, the rotating body is rotatably supported inside a recess portion of the body; within the recess portion, the energy absorption portion of the second energy absorption member is pulled out from the outer peripheral portion of the rotating body toward the outer side in the radial direction of the rotating body; and within the recess portion, the deforming portion is disposed at the outer side in the radial direction of the rotating body.

According to the webbing take-up device of the first aspect, an increase in size of the body of the webbing take-up device can be suppressed.

According to the webbing take-up device of the second aspect, an increase in size of the webbing take-up device in the axial direction of the spool can be suppressed.

According to webbing take-up device of the third aspect, the second force limiter load can be switched to a smaller load.

According to the webbing take-up device of the fourth aspect, the slider can be moved away from the energy absorption portion in an instant, enabling the second force limiter load to be switched to a smaller load.

BRIEF DESCRIPTION OF THE DRAWINGS

An exemplary embodiment of the invention will be described in detail with reference to the following figures, wherein.

DETAILED DESCRIPTION

Figure 1:
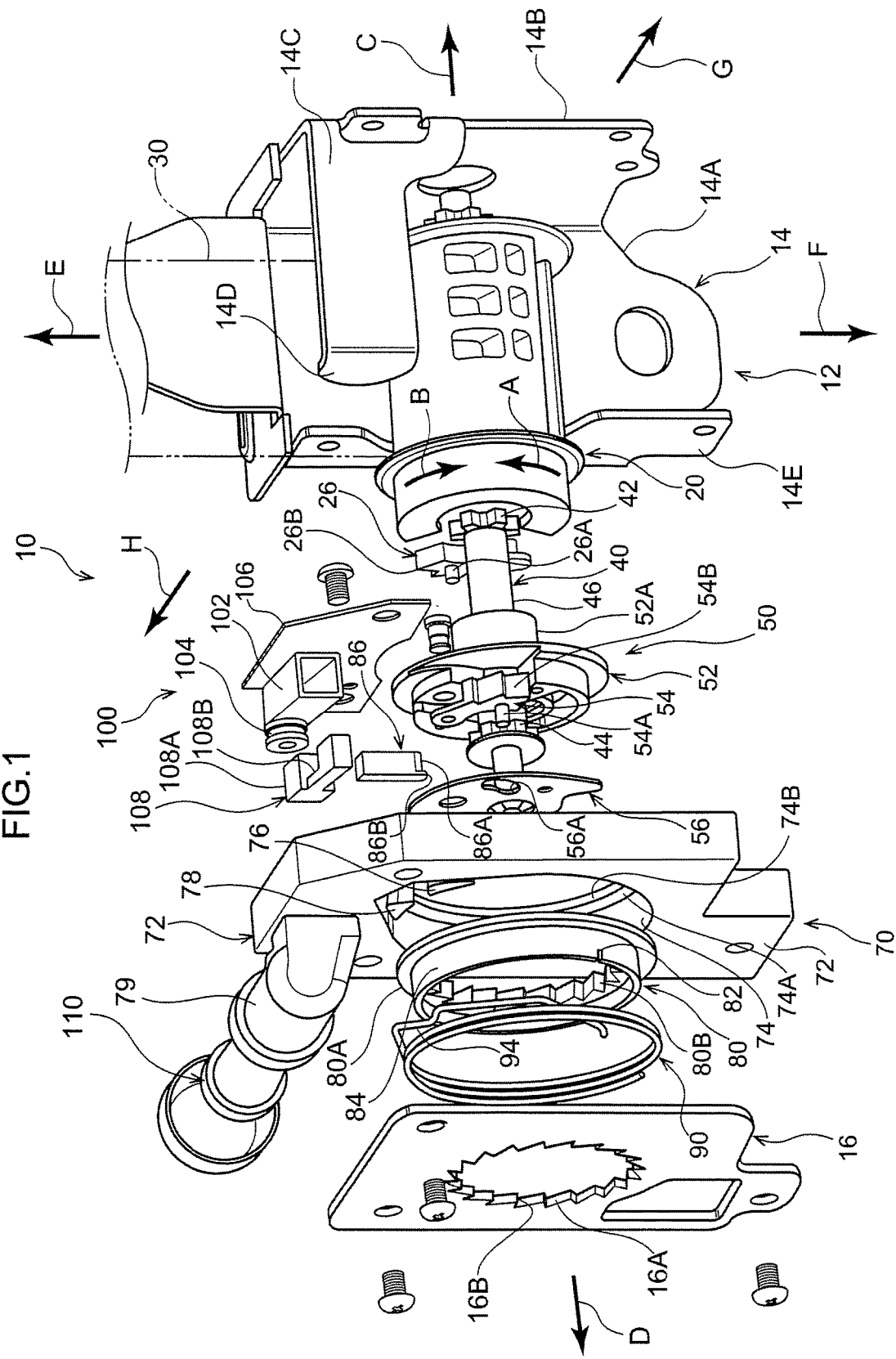
FIG. 1 is an exploded perspective view showing relevant portions of a webbing take-up device according to an exemplary embodiment.

Explanation follows regarding an exemplary embodiment of the present invention, with reference to the drawings. As shown in FIG. 1, a webbing take-up device 10 according to an exemplary embodiment of the present invention is configured including a frame 12 that is fixed to a vehicle body, a spool 20 disposed inside the frame 12, and a torsion shaft 40 serving as a "first energy absorption member". The webbing take-up device 10 further includes a lock mechanism 50, a sensor mechanism 60 (see FIG. 2), an energy absorption mechanism 70, and a switching mechanism 100. Explanation follows regarding respective configurations thereof.

Frame 12

The frame 12 is configured including a frame body 14 and a side plate 16. The frame body 14 includes a plate shaped back plate 14A, fixed to the vehicle body. A side plate 14B extends substantially at a right angle from one width direction end of the back plate 14A (the end on the arrow C direction side in FIG. 1). The frame body 14 further includes a coupling tab (piece) 14C that faces an upper portion of the back plate 14A (a portion on the arrow E direction side in FIG. 1). The coupling tab 14C extends from an upper portion of a leading end of the side plate 14B. A leading end portion of the coupling tab 14C is formed with a first attachment tab (piece) 14D, the first attachment tab 14D being bent toward the back plate 14A side so as to face the side plate 14B. A second attachment tab (piece) 14E extends substantially at a right angle from another width direction end of the back plate 14A, the second attachment tab 14E being disposed facing the side plate 14B. The extension length of the second attachment tab 14E is set shorter than the extension length of the side plate 14B, and the second attachment tab 14E is disposed in the same plane as (flush with) the first attachment tab 14D.

The side plate 16 is formed in a substantially rectangular plate shape, and is disposed parallel to the first attachment tab 14D and the second attachment tab 14E. The side plate 16 is fixed to the first attachment tab 14D and the second attachment tab 14E through a body 72, described later. A circular shaped placement hole 16A is formed in the side plate 16, and ratchet teeth 16B (inner teeth) are formed around the entire inner circumference of the placement hole 16A.

Spool 20

The spool 20 is formed in a substantially circular cylinder shape, is disposed inside the frame 12 with the axial direction along the width direction of the back plate 14A, and is indirectly supported by the frame 12 so as to be capable of rotation. One end portion in a length direction (a base end portion) of a webbing 30, formed in an elongated belt shape, is coupled and fixed to the spool 20. The webbing 30 is taken up from a base end side in a layered shape on an outer peripheral portion of the spool 20 by rotation of the spool 20 in a take-up direction (the arrow A direction in FIG. 1). Configuration is made such that by pulling a side of anther end portion in the length direction (a leading end portion) of the webbing 30, the spool 20 is rotated in a pull-out direction (the arrow B direction in FIG. 1), pulling the webbing 30 out from the spool 20.

Figure 2:
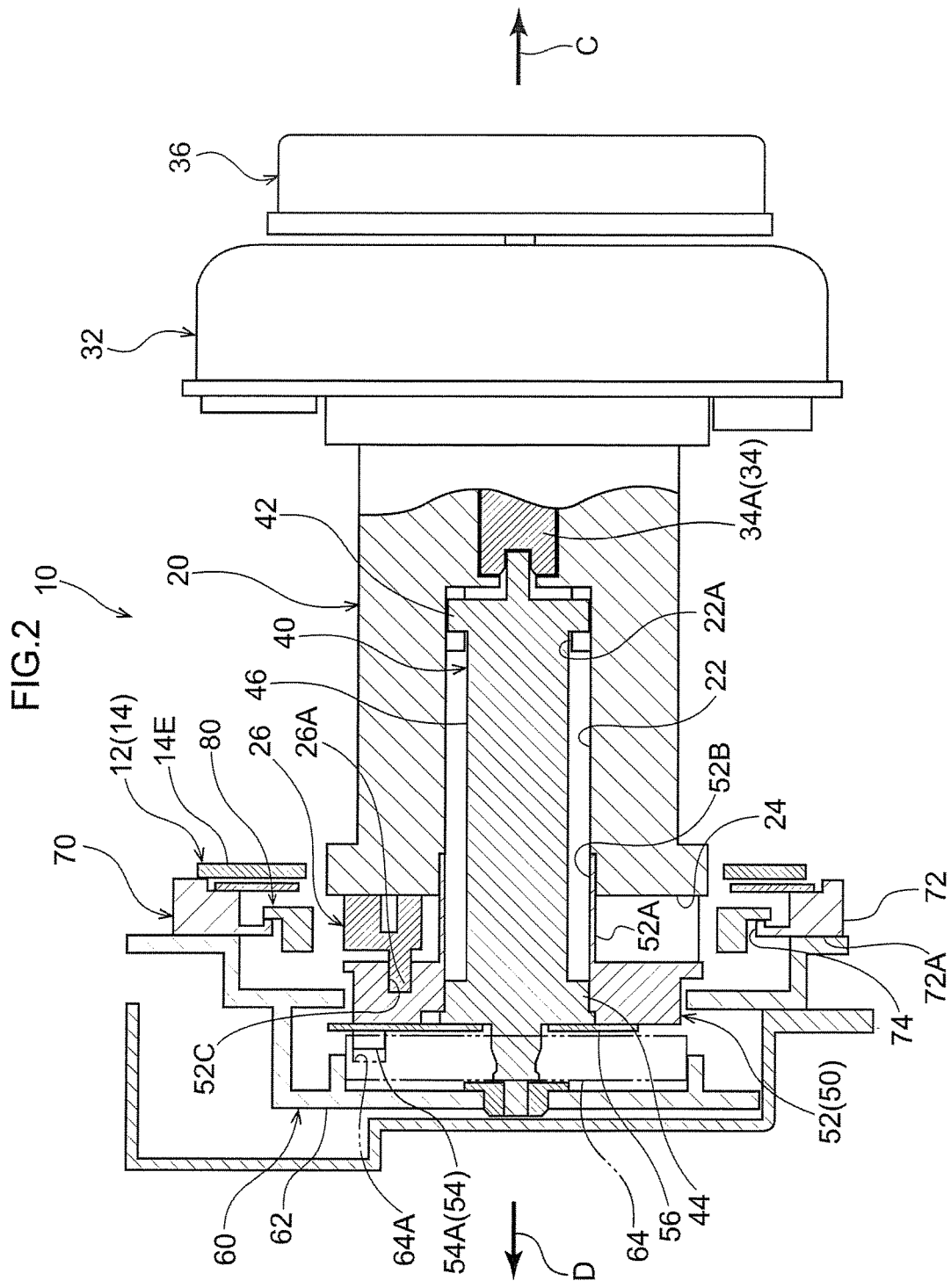
FIG. 2 is a schematic cross-section showing relevant portions of the webbing take-up device shown in FIG. 1.

As shown in FIG. 2, a through hole (penetrate-hole) 22 is formed penetrating in an axial center portion of the spool 20.

Figure 3:
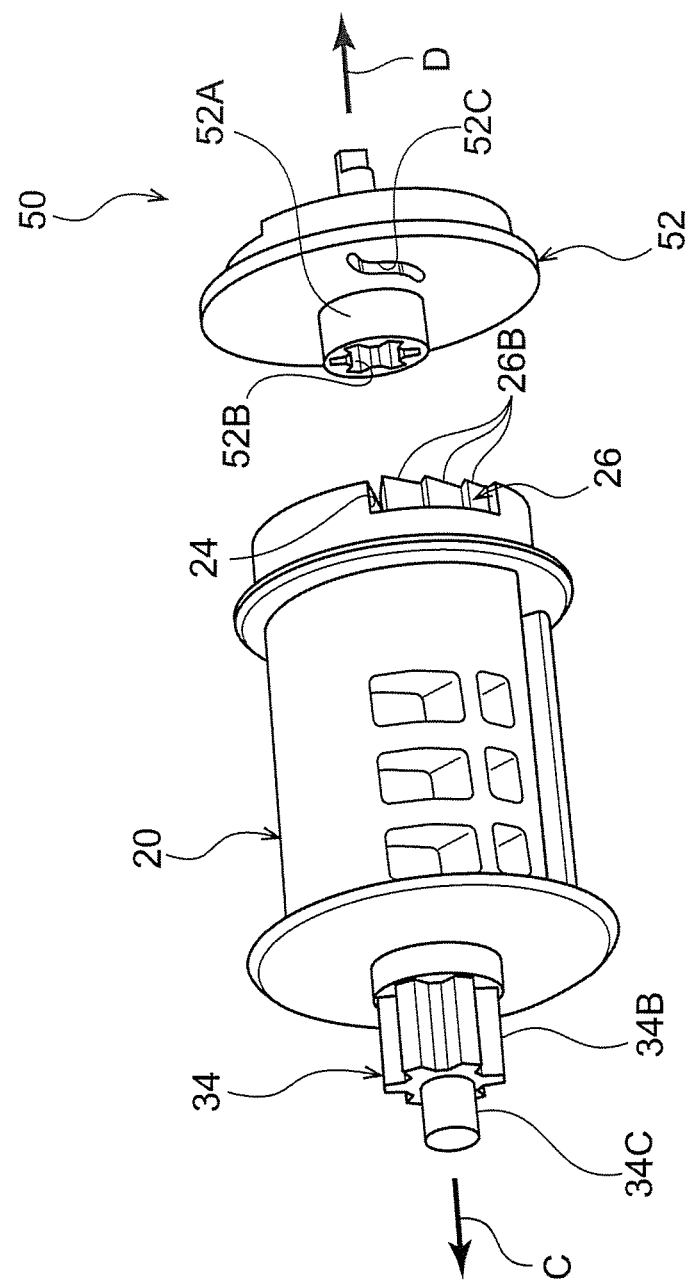
FIG. 3 is a perspective view of the spool and the lock base shown in FIG. 1.

A support shaft 34A of a pinion 34 configuring a known pre-tensioner mechanism 32 is fitted into a portion of the through hole 22 on one end side in the axial direction of the spool 20 (the arrow C direction side in FIG. 2), so as to be capable of rotating as integrally (as a unit) therewith. As shown in FIG. 3, one end side of the pinion 34 is formed with pinion teeth 34B, and the pinion teeth 34B are disposed on the one side in the axial direction of the spool 20 (the arrow C direction side in FIG. 3) with respect to the spool 20. One end portion 34C of the pinion 34 projects out further to the one side in the axial direction of the spool 20 than the pre-tensioner mechanism 32, and is disposed inside a biasing mechanism 36 (see FIG. 2). The biasing mechanism 36 includes a spiral spring (not shown in the drawings). A spiral direction inside end of the spiral spring is fixed to the one end portion 34C of the pinion 34, and the spiral direction outside end of the spiral spring is coupled to the side plate 14B (the frame 12), such that the spiral spring biases the spool 20 in the take-up direction.

As shown in FIG. 2, at an inner peripheral portion of the through hole 22 of the spool 20, an engaged portion 22A is formed, that is engaged with the torsion shaft 40, described later, at a position adjacent to the support shaft 34A of the pinion 34. An inner peripheral portion of the engaged portion 22A is formed with a spline shape as viewed along the axial direction of the spool 20. At the axial direction another end portion of the spool 20, a pawl housing portion 24 serving as a "housing portion" is formed, that houses a FL lock pawl 26, described later. The pawl housing portion 24 is disposed further to the outer side in the radial direction of the spool 20 than the through hole 22, and is open toward the outer side in the radial direction of the spool 20 (see FIG. 3).

Figure 5:
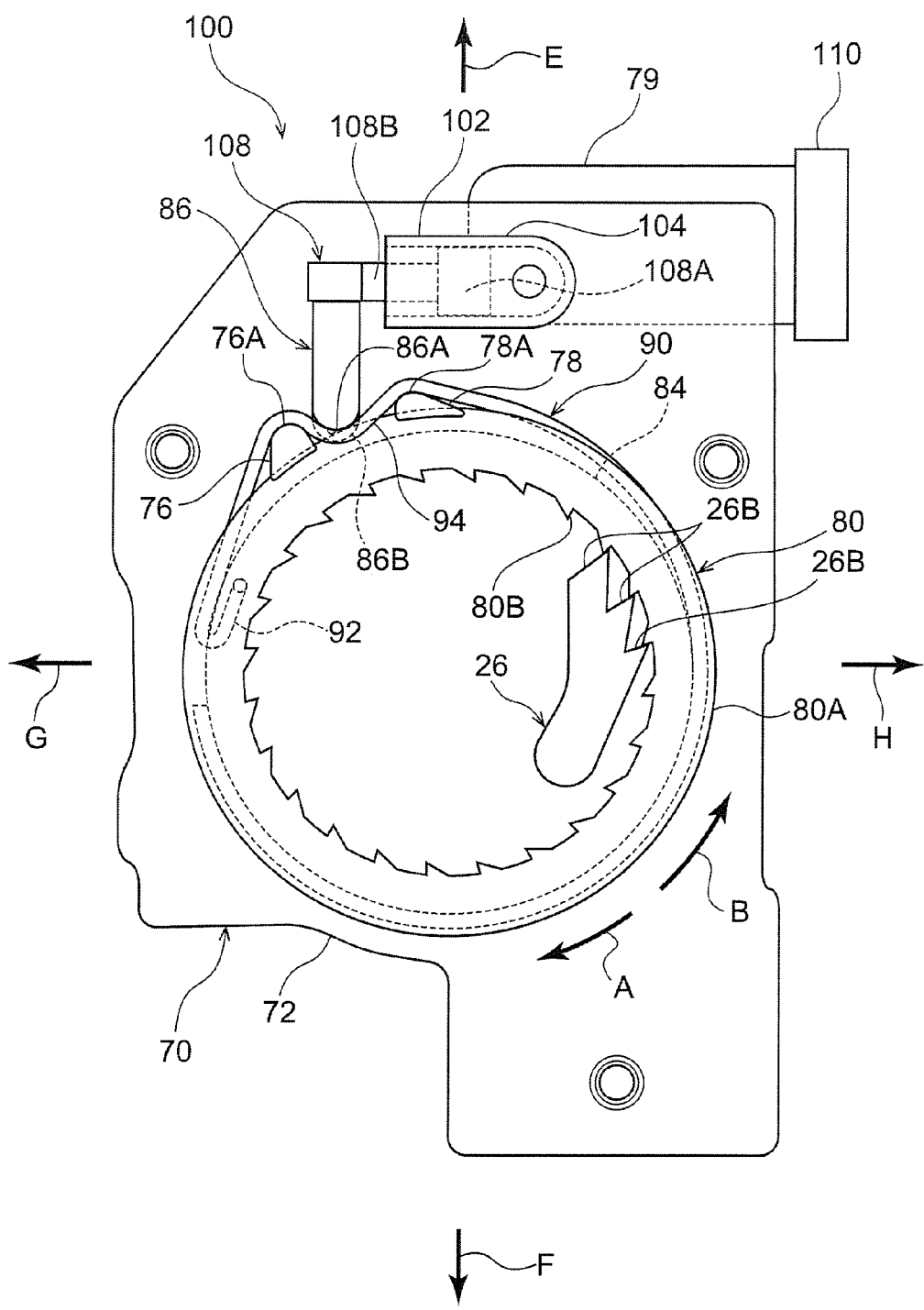
FIG. 5 is an explanatory drawing viewed from one side in the spool axial direction, to explain deformation of a wire by a first deforming portion and a second deforming portion when the slider shown in FIG. 1 is disposed in an initial position.

As shown in FIG. 1, the FL lock pawl 26, serving as a "coupling member", is movably housed inside the pawl housing portion 24. The FL lock pawl 26 is formed in a substantially triangular plate shape. One end portion of the FL lock pawl 26 is integrally formed with a circular column shaped guide shaft 26A. The guide shaft 26A projects out toward the another side in the axial direction of the spool 20 (the arrow D direction side in FIG. 1), and is movably inserted into one end portion of a guide groove 52C of a lock base 52, described later (see FIG. 2). Moreover, as shown in FIG. 3 and FIG. 5, at an outer peripheral portion of the one end portion of the FL lock pawl 26, ratchet teeth 26B are formed. The ratchet teeth 26B are exposed from the pawl housing portion 24 in a housed state of the FL lock pawl 26 in the pawl housing portion 24 of the spool 20 (see FIG. 3).

Torsion Shaft 40

As shown in FIG. 2, the torsion shaft 40 is disposed coaxially to the spool 20, and is inserted into the through hole 22. One end portion of the torsion shaft 40 (the end portion on the arrow C direction side in FIG. 2) is formed with a first engagement portion 42. An outer peripheral portion of the first engagement portion 42 is formed with a spline shape (see FIG. 1 for details), and the first engagement portion 42 is fitted into and engages with the engaged portion 22A of the spool 20. The torsion shaft 40 accordingly engages with the spool 20 so as to be capable of rotating integrally (as a unit) therewith. Another end portion of the torsion shaft 40 projects out further than the spool 20 toward the another side in the axial direction of the spool 20, and is rotatably supported by a sensor cover 62 of the sensor mechanism 60, described later.

At a portion on another end side of the torsion shaft 40, a second engagement portion 44 is formed, that engages with the lock base 52 of the lock mechanism 50, described later. The second engagement portion 44 is disposed further toward the another side in the axial direction of the spool 20 than the pawl housing portion 24 of the spool 20, and an outer peripheral portion of the second engagement portion 44 is formed with a spline shape (see FIG. 1 for details). A portion of the torsion shaft 40 between the first engagement portion 42 and the second engagement portion 44 configures a first energy absorption portion 46. The first energy absorption portion 46 is formed in a shaft shape with a circular cross-section profile. The first energy absorption portion 46, described in more detail later, is configured so as to undergo torsional deformation (twisting deformation) to absorb kinetic energy of an occupant, which is used for a pulling of the webbing 30.

Lock Mechanism 50

As shown in FIG. 1, the lock mechanism 50 is configured including the lock base 52 and a lock plate 54. As shown in FIG. 3, the lock base 52 is formed in a substantially circular cylinder shape, and is disposed at the another side in the axial direction of the spool 20 with respect to the spool 20. The lock base 52 is integrally formed with a substantially circular cylinder shaped circular cylinder shaft 52A, the circular cylinder shaft 52A being disposed coaxially to the lock base 52, and projecting out from the lock base 52 toward the spool 20 side. An engaged hole 52B is formed at an axial center portion of the lock base 52, the engaged hole 52B being formed with a spline shape as viewed along the axial direction of the lock base 52 (see FIG. 3). The second engagement portion 44 of the torsion shaft 40 is fitted into and engages with the engaged hole 52B inside, such that the lock base 52 (the lock mechanism 50) and the torsion shaft 40 engage so as to be capable of rotating integrally (as a unit). In this state, the lock base 52 is disposed adjacent to the pawl housing portion 24 of the spool 20, on the another side in the axial direction of the spool 20 (see FIG. 2).

At the lock base 52, the guide groove 52C (see FIG. 3) is formed, that is for leading (guiding) the FL lock pawl 26 described above. The guide groove 52C is formed in a substantially S-shape as viewed along the axial direction of the spool 20, and is open toward the spool 20 side. The guide shaft 26A of the FL lock pawl 26 is movably inserted into one end portion of the guide groove 52C.

Relative rotation of the spool 20 in the pull-out direction with respect to the lock base 52 causes to move the guide shaft 26A of the FL lock pawl 26 from the one end portion toward the another end portion of the guide groove 52C. When this occurs, the FL lock pawl 26 moves toward the outer side in the radial direction of the spool 20, and the ratchet teeth 26B of the FL lock pawl 26 mesh with ratchet teeth 80B of a lock ring 80, described later (see FIG. 5 and FIG. 6).

As shown in FIG. 1, the lock plate 54 is formed in a substantially rectangular plate shape, and is movably disposed inside the lock base 52. Note that a plate shaped plate cover 56 is provided at the another side in the axial direction of the spool 20 with respect to the lock base 52, the plate cover 56 restricting movement of the lock plate 54 toward the another side in the axial direction (the arrow D direction side in FIG. 1) at the lock base 52. One end portion of the lock plate 54 is integrally formed with a circular column shaped guide projection 54A. The guide projection 54A projects out from the lock plate 54 toward the opposite side to the spool 20. The guide projection 54A is inserted through a hole portion 56A formed at the plate cover 56, and is movably inserted inside a guide groove 64A of a V gear 64 configuring the sensor mechanism 60, described later (see FIG. 2). The one end portion of the lock plate 54 is formed with ratchet teeth 54B, and the ratchet teeth 54B are configured so as to be capable of meshing with the ratchet teeth 16B of the side plate 16 of the frame 12 described above.

Sensor Mechanism 60

As shown in FIG. 2, the sensor mechanism 60 is disposed on the another aside in the axial direction of the spool 20 with respect to the frame 12. The sensor mechanism 60 includes a sensor cover 62, the sensor cover 62 being formed in a substantially box shape open toward the frame 12 side and being coupled to the frame 12. The V gear 64 that has a substantially circular disk shape is provided inside the sensor cover 62. The V gear 64 is disposed coaxially to the spool 20, and is rotatably supported by the another end portion of the torsion shaft 40. At the V gear 64, the guide groove 64A is formed, and the guide projection 54A of the lock plate 54 is movably inserted inside the guide groove 64A.

The sensor mechanism 60 is configured to actuate in at least one event of a sudden vehicle deceleration or a sudden rotation of the spool 20 in the pull-out direction. When actuation of the sensor mechanism 60, rotation of the V gear 64 in the pull-out direction is restricted, and the spool 20 (the lock base 52) rotates in the pull-out direction relative to the V gear 64. Configuration is made such that due to the lock base 52 rotating in the pull-out direction with respect to the V gear 64, the guide projection 54A of the lock plate 54 moves within the guide groove 64A of the V gear 64, such that the lock plate 54 moves toward the outer side in the radial direction of the lock base 52, and the ratchet teeth 54B of the lock plate 54 meshes with the ratchet teeth 16B of the frame 12.

Energy Absorption Mechanism 70

As shown in FIG. 2, the energy absorption mechanism 70 is provided between the frame 12 and the sensor mechanism 60. Moreover, as shown in FIG. 1, the energy absorption mechanism 70 is configured including the body 72, the lock ring 80 serving as a "rotating body", a slider 86, and a wire 90 serving as a "second energy absorption member".

The body 72 is formed in a substantially rectangular parallelepiped box shape open toward the frame 12 side, and is fixed to the first attachment tab 14D and the second attachment tab 14E of the frame 12. The side plate 16 of the frame 12 described above is fastened and fixed to a bottom wall 72A of the body 72 from the another side in the axial direction of the spool 20.

A recess portion 74, open toward the another side in the axial direction of the spool 20, is formed at a substantially central portion of the body 72. The recess portion 74 is formed in a substantially circular shape as viewed along the axial direction of the spool 20, and is disposed coaxially to the spool 20. A circular shaped placement hole 74B is formed at a bottom wall 74A of the recess portion 74, penetrating the bottom wall 74A, and the placement hole 74B being disposed coaxially to the spool 20. The pawl housing portion 24 of the spool 20 is disposed within the placement hole 74B and the recess portion 74.

Figure 4:
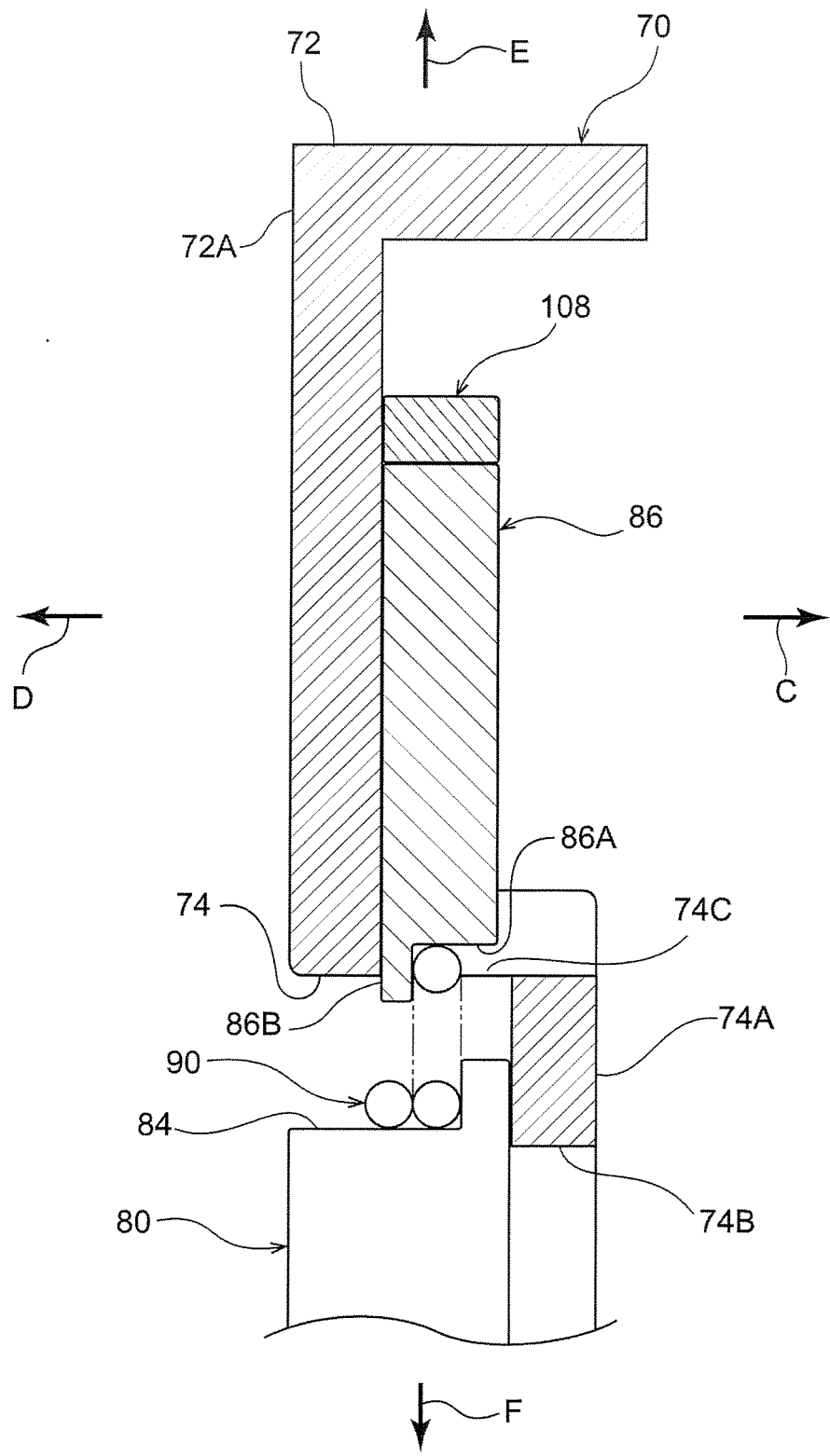
FIG. 4 is an enlarged cross-section showing a housed state of a slider in the body shown in FIG. 1.

A pair of deforming columns 76 and 78 are integrally formed at an upper portion of the bottom wall 74A of the recess portion 74. The deforming columns 76 and 78 are formed in column shapes, projecting out from the bottom wall 74A toward the another side in the axial direction of the spool at a separation from each other in the circumferential direction of the placement hole 74B. As shown in FIG. 5, first deforming portions 76A and 78A, serving as "deforming portion", are formed at outer peripheral portions of the deforming columns 76 and 78. The first deforming portions 76A and 78A are curved so as to protrude toward the upper side as viewed along the axial direction of the spool 20. As shown in FIG. 4, a communication hole 74C, in which the slider 86, described later, is disposed, is formed at an upper portion at a side wall of the recess portion 74. The communication hole 74C places the inside of the recess portion 74 in communication with the inside of the body 72.

As shown in FIG. 1, a gas generator housing portion 79 that houses a gas generator 110 of the switching mechanism 100, described later, is integrally formed at a portion of an upper portion of the body 72 which portion is on the opposite side to the frame 12. The gas generator housing portion 79 is formed in a bottomed, substantially circular cylinder shape, and is disposed with its axial direction along the extension direction of the side plate 14B (along the arrow G direction and the arrow H direction in FIG. 1).

The lock ring 80 is formed in a substantially circular cylinder shape, and is disposed coaxially to the spool 20. The lock ring 80 is rotatably supported at the body 72 inside the recess portion 74 of the body 72, and is disposed at the outer side in the radial direction of the spool 20 with respect to the pawl housing portion 24 of the spool 20. At an outer peripheral portion of the lock ring 80, a ring shaped flange portion 80A is integrally formed at one end portion in the axial direction of the lock ring 80 (end portion on the arrow C direction side in FIG. 1). The flange portion 80A is disposed facing an inner peripheral face of the recess portion 74 of the body 72. The pair of deforming columns 76 and 78 described above are disposed at the outer side in the radial direction of the lock ring 80 with respect to the ring shaped flange portion 80A.

Ratchet teeth 80B (inner teeth) are formed at an inner peripheral portion of the lock ring 80 at a portion at the one end side in the axial direction of the lock ring 80. The ratchet teeth 80B are formed around the entire circumference of the lock ring 80. The ratchet teeth 80B are moreover configured so as to be capable of meshing with the ratchet teeth 26B of the FL lock pawl 26 described above. Specifically, by relative rotation of the spool 20 in the pull-out direction with respect to the lock base 52, the FL lock pawl 26 moves toward the outer side in the radial direction of the spool 20, such that the ratchet teeth 26B of the FL lock pawl 26 mesh with the ratchet teeth 80B of the lock ring 80 as described above (see FIG. 5 and FIG. 6). Accordingly, configuration is made such that when actuation of the FL lock pawl 26, the lock ring 80 and the spool 20 are coupled together via the FL lock pawl 26, and the lock ring 80 and the spool 20 rotate together in the pull-out direction.

Moreover, at another end portion in the axial direction of the lock ring 80, an anchor groove 82 is formed that anchors an anchor hook 92 of the wire 90, described later. The anchor groove 82 is formed in a slit shape, and is open toward the another side in the axial direction of the lock ring 80. A wire attachment face 84, onto which the wire 90 is wound, described later, is configured at an outer peripheral portion of the lock ring 80, the wire attachment face 84 being disposed facing the inner peripheral face of the recess portion 74 of the body 72, and forming a concentric circular shape with the outer peripheral portion of the spool 20 as viewed along the spool 20 axial direction.

The slider 86 is formed in a substantially rectangular column shape with its length direction along an up and down direction (the arrow E direction and the arrow F direction in FIG. 1). Moreover, as shown in FIG. 5, the slider 86 is housed inside the body 72 at the upper side of the lock ring 80, and is supported by the bottom wall 72A of the body 72 so as to be capable of sliding in the up and down direction (in direction away from and approaching to the wire 90 (94)).

A lower end face of the slider 86 (the face on the arrow F direction side in FIG. 1 and FIG. 5) configures a second deforming portion 86A serving as "deforming portion". The second deforming portion 86A is curved in a substantially circular arc shape protruding toward the lower side (toward the axial center side) as viewed along the spool 20 axial direction. A stopper projection 86B is integrally formed to a lower end portion of the slider 86 at a portion on the side of the bottom wall 72A of the body 72. The stopper projection 86B projects out toward the lower side with respect to the second deforming portion 86A of the slider 86.

As shown in FIG. 5, an upper end face of the slider 86 abuts (is engaged with) a lower face of a leading end portion (another end portion) of a piston 108, described later, blocking (preventing) movement of the slider 86 toward the upper side. The second deforming portion 86A of the slider 86 is disposed between the pair of deforming columns 76 and 78 (in what is referred to below as the "initial position").

The wire 90 is configured by an elongated wire member, and is attached to the wire attachment face 84 of the lock ring 80. Specifically, as shown in FIG. 5, one end portion in a length direction of the wire 90 is formed with the anchor hook 92 that is bent around into a substantially U-shape. The bent portion of the anchor hook 92 is inserted into the anchor groove 82 of the lock ring 80, anchoring the anchor hook 92 in the anchor groove 82. The wire 90 extends from the anchor hook 92 (one end portion) around on the wire attachment face 84 toward the take-up direction, and is wound onto the wire attachment face 84 from the anchor hook 92 (one end portion) to another end portion in the length direction of the wire (see FIG. 1 for details). In the wound-on state of the wire 90 to the wire attachment face 84, the wire 90 is disposed in a layered shape along the axial direction of the lock ring 80, and the another end in the length direction of the wire 90 is open (free). The wire 90 is accordingly disposed between the wire attachment face 84 and the inner peripheral face of the recess portion 74.

Moreover, a portion of the wire 90 wound onto the wire attachment face 84 is drawn out from the wire attachment face 84 toward outer side in the radial direction of the lock ring 80, curving so as to pass between the first deforming portions 76A and 78A of the pair of deforming columns 76 and 78 and the second deforming portion 86A of the slider 86. This drawn-out portion configures a second energy absorption portion 94, serving as a "energy absorption portion". The second energy absorption portion 94 abuts the first deforming portions 76A and 78A and the second deforming portion 86A, and is bent into a substantially M-shape as viewed along the spool 20 axial direction. In this state, as shown in FIG. 4, the stopper projection 86B and the wire 90 overlap each other in the spool 20 axial direction (the arrow C direction and the arrow D direction in FIG. 4), and the stopper projection 86B restricts movement of the wire 90 toward the another side in the axial direction of the lock ring 80 (the arrow D direction side in FIG. 4).

As shown in FIG. 5, by the lock ring 80 rotating in the pull-out direction (the arrow B direction in FIG. 5), the second energy absorption portion 94 of the wire 90 is deformed by the pair of first deforming portions 76A and 78A and the second deforming portion 86A ("the second energy absorption portion 94 of the wire 90" and "the pair of first deforming portions 76A and 78A and the second deforming portion 86A" are abutted each other and relatively pressed each other, so the second energy absorption portion 94 of the wire 90 is deformed). Accordingly, as described in detail later, when the energy absorption mechanism 70 is actuated, the second energy absorption portion 94 of the wire 90 is deformed, and the first energy absorption portion 46 of the torsion shaft 40 undergoes twisting deformation. Configuration is thus made such that kinetic energy of the occupant, which is used for pulling of the webbing 30, is absorbed by the first energy absorption portion 46 and the second energy absorption portion 94.

Note that since the second energy absorption portion 94 of the wire 90 is drawn out from the wire attachment face 84 toward the outer side in the radial direction of the lock ring 80 and hooked (attached) around the pair of deforming columns 76 and 78, a tensile load acts on the wire 90 along the length direction of the wire 90. Accordingly, configuration is made such that when the lock ring 80 rotates toward the pull-out direction, the wire 90 deformed by the pair of deforming columns 76 and 78 and the slider 86 (the deformed portion of the wire 90) returns to being wound onto the wire attachment face 84 after being deformed.

Switching Mechanism 100

As shown in FIG. 1, the switching mechanism 100 is configured including a cylinder 102, the piston 108, and the gas generator 110 serving as a "gas generator".

The cylinder 102 is housed inside the body 72 at the upper side of the lock ring 80. The cylinder 102 is formed in a substantially rectangular tube shape, and is disposed with its axial direction running parallel to the axial direction of the gas generator housing portion 79 of the body 72. At one end portion of the cylinder 102 (the arrow H direction end portion in FIG. 1), a substantially tube shaped tube shaped portion 104 is integrally provided, the tube shaped portion 104 projecting out from the cylinder 102 toward the side of the gas generator housing portion 79 of the body 72 (the another side in the axial direction of the spool 20) and placing the inside of the cylinder 102 in communication with the inside of the gas generator housing portion 79. Note that the frame 12 side of the cylinder 102 is provided with a substantially rectangular plate shaped support plate 106. The support plate 106 is fastened and fixed to the body 72 with the plate thickness direction of the support plate 106 being in the spool 20 axial direction. Movement of the cylinder 102 toward the frame 12 side is accordingly restricted by the support plate 106.

The piston 108 is formed in a substantially rectangular parallelepiped block shape, with its length direction along the axial direction of the cylinder 102. One end portion of the piston 108 (the arrow H direction end portion in FIG. 1) is integrally formed with a substantially cube shaped base portion 108A, and the base portion 108A is inserted inside the cylinder 102 in a sealed state. Configuration is made such that actuation of the gas generator 110, described later, supplies gas into the cylinder 102, moving the piston 108 toward the another end side (the arrow G side in FIG. 1) of the cylinder 102.

An intermediate portion in the length direction of the piston 108 is formed with a switching concave (indentation) portion 108B, the switching concave portion 108B being formed in a concave (indented) shape open toward the one side in the axial direction of the spool 20 (the support plate 106 side), and passing through (penetrating) the piston 108 in the up and down direction (the arrow E direction and arrow F direction in FIG. 1).

Figure 6:
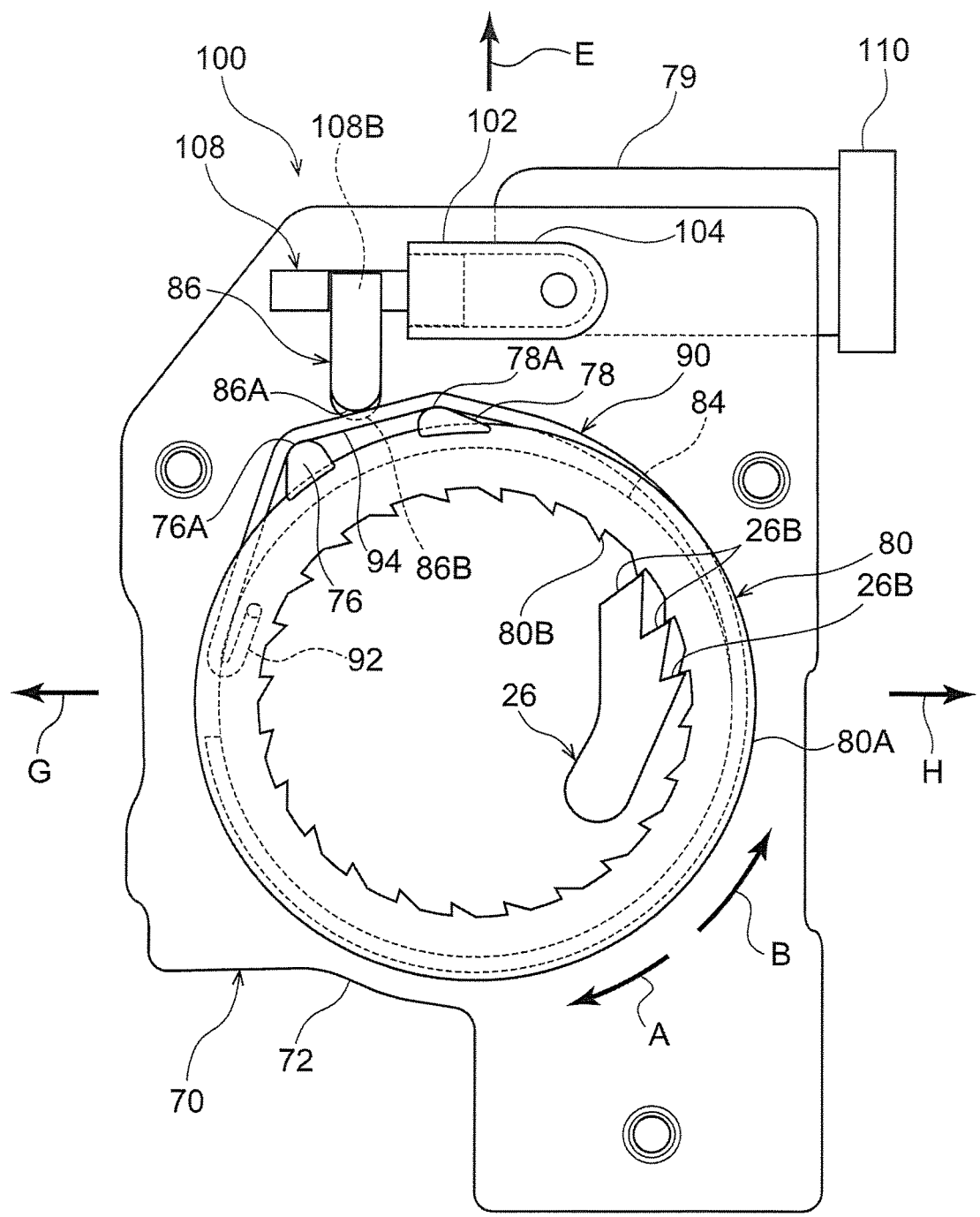
FIG. 6 is an explanatory drawing, corresponding to FIG. 5, to explain a state in which a switching mechanism has actuated, and the slider has moved from the state shown in FIG. 5 toward a direction away from a second energy absorption portion.

As shown in FIG. 6, when the piston 108 moves toward the another end side of the cylinder 102 and the switching concave portion 108B of the piston 108 is disposed (positioned) at the upper side of the slider 86, the slider 86 moves from the initial position toward the upper side (in the arrow E direction in FIG. 6) due to a pressing force toward the upper side acting on the slider 86 from the wire 90, such that the slider 86 is inserted into the switching concave portion 108B of the piston 108. Accordingly, when in this state, the wire 90 is deformed only by the first deforming portions 76A and 78A of the pair of deforming columns 76 and 78.

As shown in FIG. 1, the gas generator 110 is formed in a substantially circular column shape, housed inside the gas generator housing portion 79 of the body 72. The gas generator 110 is electrically connected to a controller of the vehicle (not shown in the drawings). Configuration is made such that on actuation of the gas generator 110 under control of the controller, the gas generator 110 generates gas and supplies the gas into the cylinder 102, moving the piston 108 toward the another end side of the cylinder 102.

The controller is moreover electrically connected to a frame (physique) detection section, not shown in the drawings. The frame detection section detects the frame (physique) of an occupant seated in a seat using, for example, a load sensor, a belt sensor, a seat position sensor, and(or) the like. Specifically, the load sensor detects load acting on a vehicle seat, and the frame detection section detects the frame of the occupant using the detected load. The belt sensor detects a pull-out amount of the webbing 30 from the spool 20, and the frame detection section detects the frame of the occupant using the detected pull-out amount. The seat position sensor is configured by a position detection sensor that detects a slide position of the vehicle seat in the front and rear direction, or a camera sensor provided in the vehicle compartment. The frame detection section detects the frame of the occupant using the seat position detected by the seat position sensor.

The controller is moreover electrically connected to a collision detection section, not shown in the drawings. The collision detection section predicts a vehicle collision using, for example, an acceleration sensor that detects the acceleration (in particular sudden deceleration) of the vehicle, a distance sensor that detects the distance to obstacle in front of vehicle, and(or) the like. Configuration is made such that the collision detection section detects a vehicle collision by the acceleration sensor detecting a collision acceleration of a predetermined reference value or greater.

Configuration is made such that the controller actuates the gas generator 110 of the switching mechanism 100 in a case in which, based on a signal from the frame detection section, the controller has determined the frame of the occupant to be smaller than a predetermined reference value, and based on a signal from the collision detection section, the controller has determined that the vehicle has been involved in a collision.

Explanation follows regarding operation and advantageous effects of the exemplary embodiment of the present invention.

First, the webbing 30 is pulled out from the spool 20 and mounted over the body of the occupant by pulling on the leading end side of the webbing 30.

Operation of the Lock Mechanism 50

In the mounted state of the webbing 30 over the body of the occupant, rotation of the V gear 64 in the pull-out direction is restricted in at least one event out of a sudden vehicle deceleration or a sudden rotation of the spool 20 in the pull-out direction, and the spool 20 (the lock base 52) rotates in the pull-out direction relative to the V gear 64. When this occurs, the guide projection 54A of the lock plate 54 moves within the guide groove 64A of the V gear 64, such that the lock plate 54 moves toward the outer side in the radial direction of the lock base 52, and the ratchet teeth 54B of the lock plate 54 mesh with the ratchet teeth 16B of the frame 12. Rotation of the lock base 52 in the pull-out direction is thus blocked (prevented), blocking (preventing) rotation of the torsion shaft 40 and the spool 20 in the pull-out direction. The webbing 30 is thereby restricted from being pulled out from the spool 20, and the body of the occupant that is attempting to move toward the front of the vehicle is restrained by the webbing 30. The body of the occupant can accordingly be restrained by the webbing 30 as a result.

Energy Absorption by the Torsion Shaft 40

In the actuated state of the lock mechanism 50 described above, the first energy absorption portion 46 undergoes twisting deformation when a rotation force of the spool 20 in the pull-out direction, caused by the body of the occupant pulling on the webbing 30 with greater force, exceeds a twisting withstand load (deformation withstand load) of the first energy absorption portion 46. Accordingly, rotation of the spool 20 in the pull-out direction is permitted at a first force limiter load (the load required for the first energy absorption portion 46 to undergo twisting deformation) or greater, and kinetic energy of the occupant, which is used for pulling on the webbing 30, is absorbed by the first energy absorption portion 46. Load (burden) on the chest of the occupant from the webbing 30 can be reduced as a result.

Operation of the Energy Absorption Mechanism 70

Due to the first energy absorption portion 46 of the torsion shaft 40 undergoing twisting deformation, the spool 20 rotates in the pull-out direction relative to the lock mechanism 50 (the lock base 52). When the spool 20 rotates in the pull-out direction relative to the lock base 52, the guide shaft 26A of the FL lock pawl 26 provided at the spool 20 moves from the one end portion to the other end portion of the guide groove 52C, and the FL lock pawl 26 moves toward the outer side in the radial direction of the spool 20. The ratchet tooth 26B of the FL lock pawl 26 accordingly mesh with the ratchet teeth 80B of the lock ring 80, such that the lock ring 80 and the spool 20 are coupled together through the FL lock pawl 26 (see FIG. 5). The lock ring 80 and the spool 20 are accordingly capable of rotating together integrally (as a unit) in the pull-out direction.

The lock ring 80 rotates in the pull-out direction (the arrow B direction in FIG. 5) when the rotation force of the spool 20 in the pull-out direction exceeds the twisting withstand load (deformation withstand load) of the first energy absorption portion 46 of the torsion shaft 40 and the deformation withstand load of the second energy absorption portion 94 of the wire 90. Namely, the second energy absorption portion 94 of the wire 90 is deformed by the first deforming portions 76A and 78A of the deforming columns 76 and 78 and the second deforming portion 86A of the slider 86. Accordingly, rotation of the spool 20 in the pull-out direction is permitted at a second force limiter load (the total of the load required for the first energy absorption portion 46 to undergo twisting deformation and the load required to deform the second energy absorption portion 94 of the wire 90) or greater, and kinetic energy of the occupant, which is used for pulling on the webbing 30, is absorbed by the first energy absorption portion 46 and the second energy absorption portion 94.

Operation of the Switching Mechanism 100

The switching mechanism 100 is actuated by the controller of the vehicle. The controller determines whether or not the body of the occupant is the predetermined reference value or greater based on a signal from the frame detection section, and determines whether or not the vehicle has been involved in a collision based on a signal from the collision detection section. In a case in which the controller has determined the body of the occupant to be the predetermined reference value or greater, the gas generator 110 is not actuated, and so the second deforming portion 86A of the slider 86 presses the second energy absorption portion 94 of the wire 90 toward the lower side in a state in which the slider 86 is disposed in the initial position as shown in FIG. 5. Accordingly, rotation of the spool 20 in the pull-out direction at the second force limiter load described above or greater is permitted in a case in which the body of the occupant is the predetermined reference value or greater.

On the other hand, in a case in which the controller has determined the body of the occupant to be below the predetermined reference value based on a signal from the frame detection section, and the controller has determined that the vehicle has been involved in a collision based on a signal from the collision detection section, the gas generator 110 is actuated under the control of the controller.

On actuation of the gas generator 110, gas is supplied from the gas generator 110 into the cylinder 102. When gas is supplied into the cylinder 102, the piston 108 moves toward the another end side of the cylinder 102. Accordingly, as shown in FIG. 6, due to the actuation of the gas generator 110, the piston 108 moves toward the another end side of the cylinder 102, disposing the switching concave portion 108B of the piston 108 at the upper side of (above) the slider 86. When the switching concave portion 108B of the piston 108 is disposed at the upper side of the slider 86, the slider 86 slides toward the upper side (in a direction away from the second energy absorption portion 94) by the pressing force from the wire 90 acting on the slider 86 toward the upper side, and the slider 86 is inserted in the switching concave portion 108B of the piston 108. When in this state, the second energy absorption portion 94 of the wire 90 is only deformed by the pair of deforming columns 76 and 78, such that the second force limiter load is switched to (becomes) a smaller load than the load described above. Accordingly, in a case in which the body of the occupant is smaller than the predetermined reference value, rotation of the spool 20 in the pull-out direction is permitted at or above a second force limiter load that is set to a small load.

Note that the lock ring 80 of the energy absorption mechanism 70 is disposed coaxially to the spool 20. The anchor hook 92 (one end portion) of the wire 90 is anchored (caught) to the lock ring 80, and the wire 90 is wound onto the wire attachment face 84 (outer peripheral face) of the lock ring 80 from the anchor hook 92 to the another end portion of the wire 90. Accordingly, excluding the second energy absorption portion 94, most of the wire 90 is disposed around on the wire attachment face 84 of the lock ring 80 that is disposed coaxially to the spool 20, enabling an increase in the size of the body of the webbing take-up device 10 to be suppressed in comparison to a case in which the lock ring 80 is disposed parallel to the spool 20.

The lock ring 80 is formed in a substantially circular cylinder (tube) shape, and is disposed at the outer side in the radial direction of the spool 20 with respect to the pawl housing portion 24 of the spool 20. An increase in size of the webbing take-up device 10 along the axial direction of the spool 20 can accordingly be suppressed.

The energy absorption mechanism 70 includes the first deforming portions 76A and 78A which are formed to the deforming columns 76 and 78, and the second deforming portion 86A which is formed to the slider 86. Moreover, as described above, on actuation of the switching mechanism 100, the slider 86 (the second deforming portion 86A) moves in a direction away from the second energy absorption portion 94. Due to the movement of the slider 86 (the second deforming portion 86A), the load required to deform the second energy absorption portion 94 is reduced, thereby enabling the second force limiter load to be switched according to the body of the occupant.

As described above, due to actuation of the gas generator 110, releasing the engaged state of the slider 86 and the piston 108, permitting movement of the slider 86 in a direction away from the second energy absorption portion 94. The slider 86 can thus be moved in an instant away from the second energy absorption portion 94, enabling the second force limiter load to be switched.

What is claimed is:

1. A webbing take-up device comprising:
a spool that rotates in a pull-out direction by a webbing being pulled out;
a first energy absorption member that extends along an axial center of the spool, that has one end portion engaged with the spool such that the first energy absorption member is capable of rotating integrally with the spool, and that is configured so as to be capable of undergoing torsional deformation;
a lock mechanism that is engaged with another end portion of the first energy absorption member so as to be capable of rotating integrally with the first energy absorption member, and that actuates to block rotation of the first energy absorption member in the pull-out direction at least one of when a vehicle suddenly decelerates or when the spool suddenly rotates in the pull-out direction;
a rotating body that is disposed coaxially with the spool, and that is coupled to the spool and is rotated in the pull-out direction together with the spool, by the spool rotating in the pull-out direction relative to the lock mechanism;
a second energy absorption member that is configured by an elongated wire member, that has one end portion anchored to the rotating body, and that is wound from the one end portion to another end portion onto an outer peripheral portion of the rotating body; and
an energy absorption portion that configures a part of the second energy absorption member, that is pulled out from the outer peripheral portion of the rotating body toward an outer side in a radial direction of the rotating body, and that is deformed by a deforming portion disposed at the outer side in the radial direction of the rotating body when the rotating body rotates in the pull-out direction, wherein:
a housing portion, that houses a coupling member that couples the spool and the rotating body, is formed at the spool; and
the rotating body is formed in a tube shape, and is disposed at the outer side in the radial direction of the spool with respect to the housing portion,
further comprising a switching mechanism, wherein:
the deforming portion is configured including a first deforming portion configured so as to be incapable of relative movement with respect to the energy absorption portion, and a second deforming portion that is configured so as to be capable of movement in a direction away from the energy absorption portion;
movement of the second deforming portion in the direction away from the energy absorption portion is blocked by the second deforming portion being engaged with the switching mechanism in a state in which the switching mechanism is not actuated; and
movement of the second deforming portion in the direction away from the energy absorption portion is permitted by actuation of the switching mechanism.

2. The webbing take-up device of claim 1, wherein:
the second deforming portion is formed as a slider configured so as to be capable of sliding in the direction away from the energy absorption portion; and
the switching mechanism includes:
a piston that is engaged with the slider and blocks movement of the slider in the direction away from the energy absorption portion,
a cylinder into which the piston is inserted, and
a gas generator that supplies gas into the cylinder by actuation thereon, and moves the piston along the cylinder to release an engaged state between the piston and the slider.

3. The webbing take-up device of claim 1, wherein:
the second deforming portion is formed as a slider configured so as to be capable of sliding in the direction away from the energy absorption portion; and
the switching mechanism includes:
a piston that is engaged with the slider and blocks movement of the slider in the direction away from the energy absorption portion,
a cylinder into which the piston is inserted, and
a gas generator that supplies gas into the cylinder by actuation thereon, and moves the piston along the cylinder to release an engaged state between the piston and the slider.

4. The webbing take-up device of claim 1, further comprising a body, wherein:
the rotating body is rotatably supported inside a recess portion of the body;
within the recess portion, the energy absorption portion of the second energy absorption member is pulled out from the outer peripheral portion of the rotating body toward the outer side in the radial direction of the rotating body; and
within the recess portion, the deforming portion is disposed at the outer side in the radial direction of the rotating body.

5. The webbing take-up device of claim 1, further comprising a body, wherein:
the rotating body is rotatably supported inside a recess portion of the body;
within the recess portion, the energy absorption portion of the second energy absorption member is pulled out from the outer peripheral portion of the rotating body toward the outer side in the radial direction of the rotating body; and
within the recess portion, the deforming portion is disposed at the outer side in the radial direction of the rotating body.

6. A webbing take-up device comprising:
a spool that rotates in a pull-out direction by a webbing being pulled out;
a first energy absorption member that extends along an axial center of the spool, that has one end portion engaged with the spool such that the first energy absorption member is capable of rotating integrally with the spool, and that is configured so as to be capable of undergoing torsional deformation;
a lock mechanism that is engaged with another end portion of the first energy absorption member so as to be capable of rotating integrally with the first energy absorption member, and that actuates to block rotation of the first energy absorption member in the pull-out direction at least one of when a vehicle suddenly decelerates or when the spool suddenly rotates in the pull-out direction;

a rotating body that is disposed coaxially with the spool, and that is coupled to the spool and is rotated in the pull-out direction together with the spool, by the spool rotating in the pull-out direction relative to the lock mechanism;

a second energy absorption member that is configured by an elongated wire member, that has one end portion anchored to the rotating body, and that is wound from the one end portion to another end portion onto an outer peripheral portion of the rotating body; and an energy absorption portion that configures a part of the second energy absorption member, that is pulled out from the outer peripheral portion of the rotating body toward an outer side in a radial direction of the rotating body, and that is deformed by a deforming portion disposed at the outer side in the radial direction of the rotating body when the rotating body rotates in the pull-out direction, wherein:

a housing portion, that houses a coupling member that couples the spool and the rotating body, is formed at the spool; and the rotating body is formed in a tube shape, and is disposed at the outer side in the radial direction of the spool with respect to the housing portion, the webbing take-up device further comprising a body, wherein:

the rotating body is rotatably supported inside a recess portion of the body;

within the recess portion, the energy absorption portion of the second energy absorption member is pulled out from the outer peripheral portion of the rotating body toward the outer side in the radial direction of the rotating body; and within the recess portion, the deforming portion is disposed at the outer side in the radial direction of the rotating body.

7. A webbing take-up device comprising:

a spool that rotates in a pull-out direction by a webbing being pulled out;

a first energy absorption member that extends along an axial center of the spool, that has one end portion engaged with the spool such that the first energy absorption member is capable of rotating integrally with the spool, and that is configured so as to be capable of undergoing torsional deformation;

a lock mechanism that is engaged with another end portion of the first energy absorption member so as to be capable of rotating integrally with the first energy absorption member, and that actuates to block rotation of the first energy absorption member in the pull-out direction at least one of when a vehicle suddenly decelerates or when the spool suddenly rotates in the pull-out direction;

a rotating body that is disposed coaxially with the spool, and that is coupled to the spool and is rotated in the pull-out direction together with the spool, by the spool rotating in the pull-out direction relative to the lock mechanism;

a second energy absorption member that is configured by an elongated wire member, that has one end portion anchored to the rotating body, and that is wound from the one end portion to another end portion onto an outer peripheral portion of the rotating body; and an energy absorption portion that configures a part of the second energy absorption member, that is pulled out from the outer peripheral portion of the rotating body toward an outer side in a radial direction of the rotating body, and that is deformed by a deforming portion disposed at the outer side in the radial direction of the rotating body when the rotating body rotates in the pull-out direction, the webbing take-up device further comprising a switching mechanism, wherein:

the deforming portion is configured including a first deforming portion configured so as to be incapable of relative movement with respect to the energy absorption portion, and a second deforming portion that is configured so as to be capable of movement in a direction away from the energy absorption portion;

movement of the second deforming portion in the direction away from the energy absorption portion is blocked by the second deforming portion being engaged with the switching mechanism in a state in which the switching mechanism is not actuated; and movement of the second deforming portion in the direction away from the energy absorption portion is permitted by actuation of the switching mechanism.

8. The webbing take-up device of claim 7, wherein:

the second deforming portion is formed as a slider configured so as to be capable of sliding in the direction away from the energy absorption portion; and the switching mechanism includes:

a piston that is engaged with the slider and blocks movement of the slider in the direction away from the energy absorption portion, a cylinder into which the piston is inserted, and a gas generator that supplies gas into the cylinder by actuation thereon, and moves the piston along the cylinder to release an engaged state between the piston and the slider.

\* \* \* \* \*